Patented Sept. 21, 1943

2,330,115

UNITED STATES PATENT OFFICE 2,330,115

CATALYTIC ISOMERIZATION OF 1-OLEFINS TO 2-OLEFINS

Harry E. Drennan, Bartlesville, Okla., assignor to Phillips Petroleum Company, a corporation of Delaware No Drawing. Application September 30, 1940, Serial No. 359,159

8 Claims. (Cl. 260—683.2)

This invention relates to a process for the catalytic isomerization of olefinic hydrocarbons, and more specifically to a novel catalyst and process for the conversion of alpha olefins to beta olefins in hydrocarbon mixtures in the vapor phase at elevated temperatures.

Alpha olefins generally referred to as 1-olefins undergo an isomerization reaction whereby the unsaturated linkage migrates toward the center of the carbon chain and beta or 2-olefins are formed. In the case of normal butene, this reaction may be represented by the equation

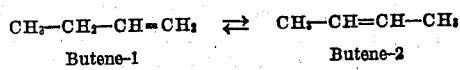

The isomers thus represented are identical in many of their chemical properties but differ rather widely in some physical characteristics. The 1-oefins for example are lower-boiling than either the 2-olefins or the corresponding paraffin hydrocarbons. This quality of butene-1 causes it to complicate the separation steps of processes producing or utilizing $C_4$ olefins, diolefins, or iso-olefins since the boiling point of butene-1 is practically the same as that of isobutene and butadiene. Thus butene-1 may appear as a contaminant in isobutene or butadiene fractions prepared by distillation, and processes involving the recovery of butenes from $C_4$ mixtures are subject to difficulties and losses since an appreciable portion of said butenes may be present as an isomer lower-boiling than the normal paraffin.

On the basis of these and other considerations it is often desirable to have the normal olefins as completely as possible in either the alpha or the beta form, and for many processes the latter form is preferable. Inability to bring about this conversion or isomerization has led in some cases to the employment of complex chemical separation and/or solvent extraction methods for the segregation of components of a hydrocarbon mixture.

The reaction which converts alpha olefins to beta olefins has been found to be of the time-equilibrium type. In other words butene-1 is converted gradually into butene-2 or vice versa until the concentration of the respective components reaches the equilibrium concentrations noted in the following table of equilibria at various temperatures.

| Temperature, °F. | Concentration in mol per cent | |
|---|---|---|
| | Butene-1 | Butene-2 |
| 80 | 2.9 | 97.1 |
| 260 | 7.7 | 92.3 |
| 440 | 13.7 | 86.3 |
| 620 | 19.8 | 80.2 |
| 980 | 30.3 | 69.7 |
| 1,340 | 38.5 | 61.5 |

From this tabulation it is seen that at high temperatures maximum amounts of butene-1 are formed, while the maximum concentrations of butene-2 are formed at low temperatures. Also, while only about 40 per cent conversion to butene-1 is possible, 97 per cent conversion to butene-2 is possible if equilibrium can be reached at low temperatures. Since the extent of conversion of one isomer to the other depends on the isomerization reaction velocity and on the time allowed for the reaction, it is evident that in any commercial operation equilibrium concentrations are attainable only when suitable treating conditions can be met.

Isomerization by thermal methods is unsatisfactory because the slow rate of reaction at low temperature levels prevents appreciable conversion of butene-1 to butene-2. Attempts have also been made to control the rate of isomerization reaction by means of catalysts and to thus obtain extensive conversion of butene-1 to butene-2 at relatively low temperatures. The difficulty with previous catalytic processes has been that the less active catalyst required too high temperatures with the result that butene-2, concentrations were limited, while the more active catalysts concurrently promoted polymerization reactions which resulted in excessive losses of olefins and other reactive components of hydrocarbon mixtures undergoing isomerization.

I have now discovered a novel catalyst for the isomerization of butene-1 which is active at such conditions of temperature and flow rate that equilibrium concentrations of butene-2 are obtained with negligible losses of olefins and diolefins through polymer formation.

I have found that when bauxite is treated with a non-volatile strong mineral acid such as sulfuric or phosphoric acid or solutions thereof an active catalyst is produced for the isomerization of 1-olefins at low temperature.

In the preparation of the catalyst, bauxite is crushed and screened to suitable particle size and treated with concentrated or dilute acid in such proportions that 10 to 50 per cent by weight of acid is added to the mineral material. Since bauxite is not soluble to a great extent in mineral acids, the exact nature of the product resulting from the acid treatment is not clear. It seems likely that a certain amount of chemical reaction occurs between the acid and the basic oxide constituents of bauxite whereby aluminum, iron, titanium and possibly other metal sulfates or phosphates are formed. It is also probable that the reaction of the acid on siliceous material in the bauxite results in the formation of silicic acid and/or other acid-insoluble silica-containing compounds. The physical structure of the bauxite is not destroyed, and reaction products seem therefore to remain mostly on the surface of the mineral particles. Further, in view of the slow reaction between the acid and bauxite, it is likely that appreciable quantities of free acid are adsorbed by the bauxite from the time of acid addition and continuing during the use of the catalyst until some indeterminate time when the acid is consumed.

The amount of acid added during the treatment and/or impregnation of the bauxite may vary rather widely. Usually more than 10 per cent by weight of either acid is used, and the activity of the catalyst increases with increasing acid content up to about 50 weight per cent of the bauxite. Since the activity of the catalyst governs the temperature of operation and/or the flow rate of reactants over the catalyst, I prefer to use bauxite treated with 25–60 per cent by weight of acid.

Acid may be added to the bauxite in any convenient manner such as spraying as a mist onto the bauxite particles, or the particles may be soaked in acid or acid solution until the calculated quantities have been taken up. Excess water of solution may be removed from the catalyst prior to use by heating to moderate drying temperatures. The finished reagent appears dry and neither acid nor aqueous material is carried away by the hydrocarbon vapors.

In the operation of the process of my invention a hydrocarbon mixture containing butene-1 is heated to a temperature in the range of 150 to about 600° F. and passed in vapor phase over a catalyst prepared in the manner described. The flow rate is maintained at a value which gives maximum conversion to butene-2 without appreciable formation of heavy polymers, usually between 0.5 and 5 liquid volumes of feed per hour per volume of catalyst.

The flow rate and temperature of any specific operation may be adjusted to the activity of the catalyst according to the factors previously described as affecting the conversion. Thus, as the activity of the catalyst is increased, the rate of isomerization is increased, or equivalent conversion may be obtained at a lower temperature or a higher flow rate of reactant. Low temperatures are desirable in view of the high equilibrium concentrations of butene-2 attainable, while higher flow rates have a tendency to suppress polymerization reactions. In general, the proper choice of operating conditions within the optimum temperature range of 150 to 600° F. will be apparent in view of the foregoing disclosure.

The unusual activity of the catalysts described herein which greatly exceeds that of any possible components thereof either alone or disposed in mixtures prepared by means other than those disclosed is attributed to the complex nature of the bauxite and the correspondingly complex nature of the acid treated material. As previously mentioned, the possible components of the acid treated catalyst include reaction products of both basic and acidic constituents of the bauxite in an indeterminate number of chemical and physical forms, besides the possible prolonged even though transient presence of adsorbed free acid.

The differences in activity due to the peculiar combination of bauxite and acid are evident from the great differences in temperature required for comparable isomerization reaction velocity over my catalyst and those prepared from the metal salts aluminum sulfate and aluminum phosphate. Thus, according to earlier data, isomerization of butene-1 to butene-2 over aluminum phosphate requires a temperature near 800° F., while with bauxite treated with phosphoric acid the conversion was effected at temperatures near 400° F. This difference indicates a totally different catalyst, and not a mere difference in degree of activity.

Pressures in my process are low super-atmospheric pressures of zero to 100 pounds gage. Higher pressures tend to promote polymerization, although they may be used in certain instances such as the presence of a diluent.

The catalytic treatment of my invention is applicable to substantially pure 1-olefins or to hydrocarbon mixtures containing same in varying concentrations and from any source such as the dehydration of alcohols or the like, or the dehydrogenation and/or pyrolysis of suitable hydrocarbon materials.

The effluents from my process containing equilibrium concentrations of 2-olefins may be treated subsequently in any desired fashion to separate and utilize said olefins such as segregation by distillation or by chemical methods followed by further dehydrogenation, polymerization or the like. If desired, the hydrocarbon mixture following removal or utilization of 2-olefins may be returned for further isomerization treatment until the 1-olefin content is substantially completely utilized. Or additional 1-olefins may be produced in said mixture by suitable means prior to successive isomerization treatments.

The following examples will serve to illustrate methods of preparing catalysts and using same according to the terms of my invention. However, since the number of modifications might be greatly multiplied, said examples are not to be construed as limitations.

*Example I*

Butene-1 was heated to a temperature of 200° F. and passed at essentially the same temperature and at a flow rate of 0.5 liquid volume of butene per hour per volume of catalyst over a catalyst consisting of bauxite which had been treated with 50 per cent by weight of sulfuric acid. The effluent gas contained 96 per cent of butene-2, while polymer formation consumed about 0.5 per cent of the charge.

When a catalyst prepared by distributing aluminum sulfate and pumice was employed with the same charge, a temperature of 700° F. was required for rapid isomerization, and conversion to butene-2 amounted to only 75 per cent.

Bauxite alone showed no isomerizing activity below 900° F. and conversion was low. Bauxite mixed with aluminum sulfate gave results comparable to results obtained with aluminum sulfate on pumice.

*Example II*

When pentene-1 is passed over a catalyst prepared by treating bauxite with 20 per cent by weight of concentrated sulfuric acid, with the temperature of treatment at 300° F., and a flow rate of one liquid volume of pentene per hour per volume of catalyst, the $C_5$ fraction of the effluents contains 80 per cent of pentene-2. Heavy polymer formation consumes 10 per cent of the charge.

*Example III*

A hydrocarbon gas comprising butene-1 was passed at a temperature of 440° F. and at a flow rate of 0.5 liquid volume of feed per hour per volume of catalyst over bauxite treated with 25 per cent by weight of ortho-phosphoric acid. The butenes in the effluents consisted of 86 per cent butene-2 and 14 per cent butene-1. Polymer loss was about 0.3 per cent of the butenes in the charge.

Using aluminum phosphate on porcelain chips as a catalyst, the same charge was treated at various temperatures. Only above 788° F. and with a flow rate of 0.2 liquid volume of charge per hour per volume of catalyst was relatively rapid reaction obtained with butene-2 concentration reaching 72 per cent of the total butenes.

When my acid-bauxite catalysts lose activity after long periods of use, I have noted that a measure of activity may be restored by treatment with additional acid. In this manner, the catalysts may be periodically treated to maintain high activity up to the point where no more acid is adsorbed by the bauxite.

I claim:

1. A process for the catalytic isomerization of 1-olefins to produce 2-olefins which comprises treating hydrocarbon mixtures containing said 1-olefins under isomerizing conditions over a catalyst consisting of bauxite having incorporated therewith 10–60 per cent by weight of a non-volatile strong mineral acid.

2. A process for the catalytic isomerization of butene-1 which comprises treating hydrocarbon gases containing said butene-1 under isomerizing conditions over a catalyst prepared by treating bauxite with at least 10 per cent by weight of sulfuric acid.

3. A process for the catalytic isomerization of butene-1 which comprises treating hydrocarbon gases containing butene-1 under isomerizing conditions over a catalyst prepared by incorporating with bauxite 10 to 60 percent by weight phosphoric acid.

4. A process for the catalytic isomerization of butene-1 which comprises treating hydrocarbon mixtures containing said butene-1 in vapor phase at temperatures above about 150° F. and at near-atmospheric pressures over a catalyst consisting of bauxite having incorporated therewith 10–60 per cent by weight of a non-volatile strong mineral acid.

5. A catalyst for the isomerization of 1-olefins to produce 2-olefins by treatment in vapor phase at super-atmospheric temperatures which consists of bauxite having incorporated therewith 10 to 60 per cent by weight of a non-volatile strong mineral acid.

6. A process for the catalytic isomerization of 1-olefins to 2-olefins which comprises contacting said 1-olefins with a catalyst comprising bauxite having incorporated therewith about 10–60 per cent by weight of a non-volatile strong mineral acid, at a temperature of about 150–600° F. and a flow rate of about 0.5 to 5 liquid volumes of charge per hour per volume of catalyst.

7. A process for the catalytic isomerization of butene-1 which comprises contacting said butene-1 with a catalyst comprising bauxite having incorporated therewith about 10–60 per cent by weight of a non-volatile strong mineral acid, at a temperature of about 150–600° F. and a flow of about 0.5 to 5 liquid volumes of charge per hour per volume of catalyst.

8. A catalyst for the isomerization of 1-olefins to produce 2-olefins by treatment in vapor phase at super-atmospheric temperatures which consists of bauxite having incorporated therewith 10 to 60 per cent by weight of phosphoric acid.

HARRY E. DRENNAN.